United States Patent
Kang et al.

(10) Patent No.: US 8,120,641 B2
(45) Date of Patent: Feb. 21, 2012

(54) PANORAMIC PHOTOGRAPHY METHOD AND APPARATUS

(75) Inventors: Seoung Ho Kang, Gumi-si (KR); Jae Wan Park, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1258 days.

(21) Appl. No.: 11/776,168

(22) Filed: Jul. 11, 2007

(65) Prior Publication Data
US 2008/0192125 A1   Aug. 14, 2008

(30) Foreign Application Priority Data
Feb. 14, 2007   (KR) .................. 10-2007-0015180

(51) Int. Cl.
*H04N 5/228* (2006.01)
(52) U.S. Cl. .......................................... 348/36
(58) Field of Classification Search ............. 348/36; 352/69, 70
See application file for complete search history.

(56) References Cited

U.S. PATENT DOCUMENTS

| | | | |
|---|---|---|---|
| 5,563,676 A * | 10/1996 | Kosaka et al. | 396/51 |
| 6,243,103 B1 * | 6/2001 | Takiguchi et al. | 345/634 |
| 6,304,284 B1 * | 10/2001 | Dunton et al. | 348/36 |
| 6,885,392 B1 * | 4/2005 | Mancuso et al. | 348/36 |
| 6,930,703 B1 * | 8/2005 | Hubel et al. | 348/37 |
| 2007/0269198 A1 * | 11/2007 | Park et al. | 396/322 |
| 2008/0043093 A1 * | 2/2008 | Song | 348/39 |
| 2011/0058015 A1 * | 3/2011 | Moriyama et al. | 348/36 |
| 2011/0169867 A1 * | 7/2011 | Kniffen et al. | 345/660 |

FOREIGN PATENT DOCUMENTS

| | | |
|---|---|---|
| JP | 07306486 | 11/1995 |
| KR | 1020060132383 | 12/2006 |

* cited by examiner

*Primary Examiner* — Douglas Blair
(74) *Attorney, Agent, or Firm* — H.C. Park & Associates, PLC

(57) ABSTRACT

An apparatus may take a panoramic photograph without the need to set the order in which panoramic images. The method includes taking a reference image that is a portion of the panoramic photograph, generating a plurality of guide images using portions of the reference image, detecting movement of an image-taking device and displaying a guide image selected according to the detected movement of the image-taking device, and taking a connected image to be stitched to the most recently taken reference image using the guide image.

18 Claims, 11 Drawing Sheets

PANORAMIC PHOTOGRAPHY METHOD AND APPARATUS

CROSS REFERENCE TO RELATED APPLICATION

This application claims priority from Korean Patent Application No. 10-2007-0015180, filed on Feb. 14, 2007, which is hereby incorporated by reference for all purposes as if fully set forth herein.

BACKGROUND OF THE INVENTION

1. Field of the Invention

The present invention relates to a panoramic photography system, and more particularly, to a method and apparatus for taking a panoramic photograph without the need to set the order in which panoramic images are taken.

2. Discussion of the Background

Panoramic photography refers to photography dedicated to taking pictures that are longer than common pictures, either in the horizontal or vertical direction, to contain more landscapes within a single photo. Typically, panoramic photography is used to stitch a sequence of pictures horizontally or vertically together into a single panoramic picture.

Panoramic photography also requires adjacent images to precisely match up because successive images are taken in different directions. One method for smoothly connecting adjacent photos together has been presented in Korean Patent No. 10-0630007. The method includes marking a portion of one photo and adjusting the position of the next photo so that it is located to fit with the marked portion.

However, the conventional panoramic photography method has a drawback in that a series of photos may need to be taken in a preset direction to create a panoramic scene. That is, in the conventional panoramic photography method, a user may need to determine the order in which photos are taken and preset the order into a photography apparatus before taking a panoramic photograph. Hence, after taking a first photo, the photography apparatus may take only the succeeding photo containing a scene located at a position determined according to the preset order.

As described above, the conventional panoramic photography method may require a user to preset the photographing order whenever a panoramic photograph is to be taken, and thus may be inconvenient for the user. The conventional method has another drawback in that photographs may have to be taken in the preset order. Thus, there is a need for a simpler and easier method of taking a panoramic photograph.

SUMMARY OF THE INVENTION

The present invention provides a method and apparatus for taking a panoramic photograph in a simple manner without the need to set the order in which panoramic images are taken.

Additional features of the invention will be set forth in the description which follows, and in part will be apparent from the description, or may be learned by practice of the invention.

The present method discloses a method for taking a panoramic photograph, including taking a reference image that is a portion of the panoramic photograph, generating a plurality of guide images using portions of the reference image, and detecting movement of an image-taking device and displaying a guide image selected according to the detected movement of the image-taking device.

The present invention also discloses an apparatus for taking a panoramic photograph, including a camera module to take a reference image that is a portion of the panoramic photograph and a connected image that is connected to a side of the reference image, a guide image generator to generate a plurality of guide images using portions of the reference image, a movement sensor to detect movement of the camera module, a guide image selector to select a guide image according to the movement of the camera module detected by the movement sensor and a display unit to display the selected guide image together with a preview image.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
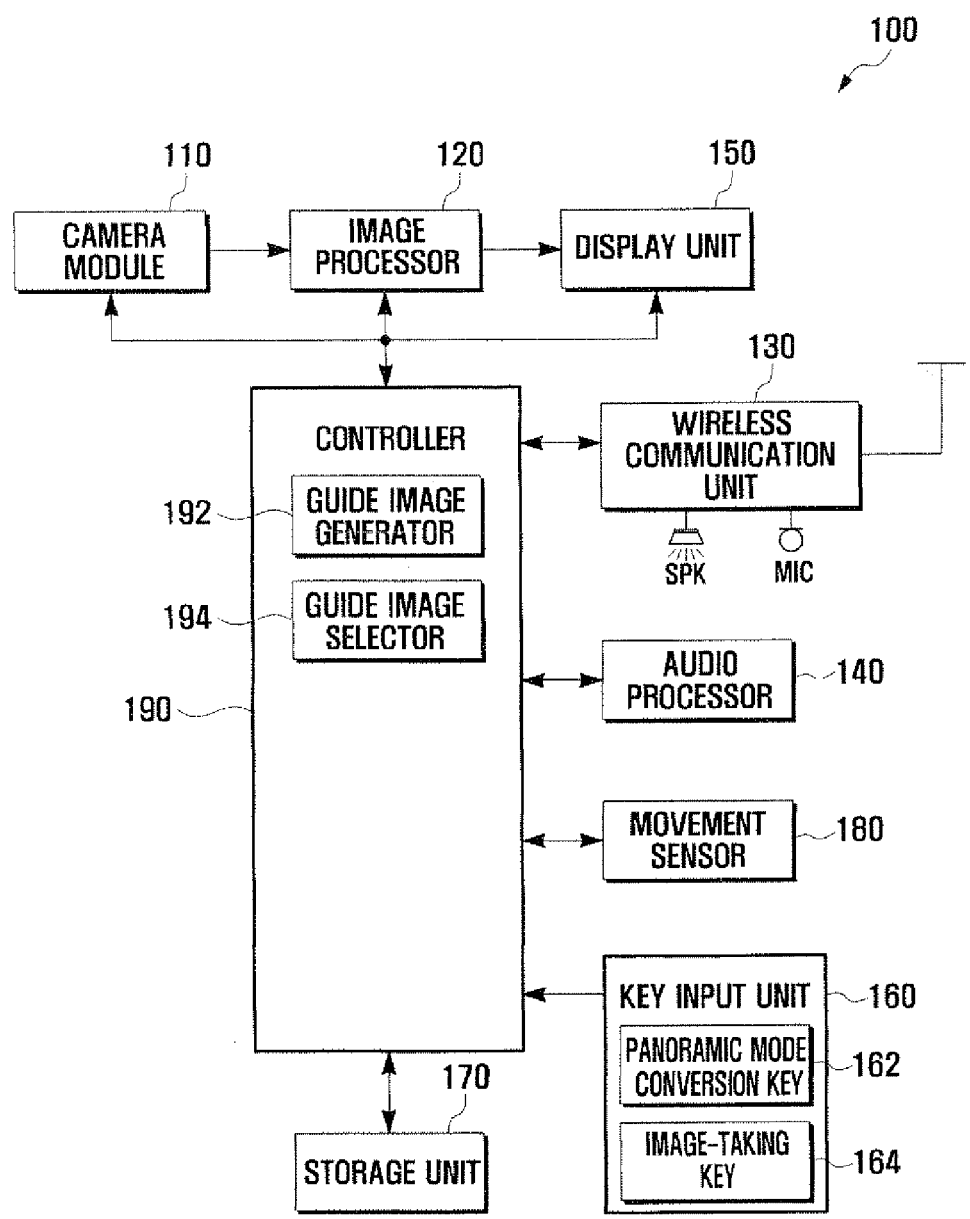
FIG. 1 is a block diagram of a configuration of an apparatus for taking a panoramic photograph according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

The dimensions of some elements in the drawings may be exaggerated for better visualization. Elements are schematically shown or omitted for simplicity and clarity and have not necessarily been drawn to scale. Thus, the dimensions of the elements and the spacing between elements are not to scale.

In the exemplary embodiments described, a reference image refers to a first image obtained while taking a panoramic photograph. The reference image is used as a reference for subsequently connected images and provides a guide image corresponding to a position in which the image-taking device may take an image to be subsequently connected.

A guide image refers to an image displayed to allow a user to easily detect the position in which to take a connected image to be subsequently stitched to the reference image. A guide image is created by extracting a specific region of the reference image. A user may match the guide image with a current preview image to detect the position where the image-taking device may capture the connected image.

Further, a connected image refers to an image that is taken after a reference image and stitched to one side (top, bottom, left, right) of the reference image (or to one side of another connected image). Thus, if connected images are consecutively taken, a previous connected image may serve as a reference image to a subsequently connected image.

Hereinafter, a method for taking a panoramic photograph using a mobile communication terminal as a panoramic photography apparatus is described. However, a panoramic photography apparatus is not limited thereto and may be any other device that is capable of taking a panoramic picture.

FIG. 1 is a block diagram of a configuration of a mobile communication terminal 100 according to an exemplary embodiment of the present invention. Referring to FIG. 1, the mobile communication terminal 100 includes a camera module 110, an image processor 120, a wireless communication unit 130, an audio processor 140, a key input unit 160, a display unit 150, a storage unit 170, a movement sensor 180, and a controller 190.

The camera module 110 may be used to take a plurality of images that are each a portion of a panoramic photograph and to obtain a preview image for taking the images. For example, the camera module 110 may be used to take a reference image that is a portion of the panoramic photograph and to take connected images that are to be stitched to a side of the reference image. The camera module 110 may include a camera sensor (not shown) that takes an image using a lens and converts the resulting optical signal to an electrical signal and a signal processor (not shown) that converts an analog image signal output from the camera sensor to digital data.

The image processor 120 processes an image signal received from the camera module 110 in frame units and outputs image data to match the display characteristics and the size of the display unit 150. The image processor 120 also compresses the image data and outputs the data to the controller 190. To achieve this function, the image processor 120 may include an image codec to compress the image data to be displayed on the display unit 150 using a predetermined compression technique and to decompress the compressed image data into original image data. The image codec may be a Joint Pictures Experts Group (JPEG) codec, a Moving Pictures Experts Group (MPEG) codec, or a Wavelet codec.

The wireless communication unit 130 transmits and receives data for wireless communication. To achieve this function, the wireless communication unit 130 may include a radio frequency (RF) transmitter to up-convert the frequency of a signal to be transmitted and amplify the signal, and an RF receiver to low-noise amplify a signal being received and down-convert its frequency. The wireless communication unit 130 receives data via a wireless channel to output to the controller 190 and receives data from the controller 190 to transmit through the wireless channel.

The audio processor 140 may include a coder/decoder (codec). The codec consists of a data codec to process data such as packet data and an audio codec to process audio signals such as a voice signal. Thus, the audio processor 140 converts digital audio data that is received and input to the controller 190 during a phone call on the mobile communication terminal 100 to an analog audio signal through the audio codec and plays back the analog audio signal through a speaker SPK. The audio processor 140 also converts an analog audio signal received through a microphone MIC to digital audio data through the audio codec and outputs the digital audio data to the controller 190.

The display unit 150 displays image data output from the camera module 110 on a screen as a preview image. The display unit 150 may be a liquid crystal display (LCD). In this case, the display unit 150 includes an LCD controller, a memory to store data, and an LCD display element. When the LCD is implemented using touch screen technology, the display unit 150 may also function as an input portion. The display unit 150 may display a guide image, described below, that overlaps the preview image so as to display the preview image and the guide image together while a panoramic photograph is being taken.

The key input unit 160 receives a user's manipulation signal to control the mobile communication terminal 100 and outputs the signal to the controller 190. To achieve this function, the key input unit 160 may include control keys (not shown) to control the operation of the mobile communication terminal 100 and multiple alphanumeric keys (not shown) to input characters and numerals. The key input unit 160 of exemplary embodiments of the present invention may further include a panoramic mode conversion key 162 and an image-taking key 164.

The panoramic mode conversion key 162 is used to convert the mobile communication terminal 100 from a standby state or an image-taking state to a state in which the mobile communication terminal 100 is able to take a panoramic photograph.

The image-taking key 164 is used to store a still image obtained by taking a preview image currently displayed on the display unit 150. The image-taking key 164 is also used to take a reference image and connected images when the mobile communication terminal 100 is in a panoramic photographing mode. According to the present exemplary embodiment, the panoramic mode conversion key 162 and the image-taking key 164 are realized in software using soft keys. However, they may be realized using a control key or in separate hardware.

The storage unit 170 may include a program memory to store programs to control the general operation of the mobile communication terminal 100 and a data memory to store data generated while executing the programs and still image data obtained by taking images. The storage unit 170 also stores a reference image, connected images, and guide images generated using the reference image and the connected images.

The movement sensor 180 detects movement of the camera module 110, i.e. movement of the mobile communication terminal 100 caused by the user. According to the present exemplary embodiment, the movement sensor 180 is a gyro sensor that detects the position of the camera module 110. However, the movement sensor 180 is not limited to a gyro sensor and may be an acceleration sensor or any other device that can be incorporated into the mobile communication terminal 100 to detect the movement of the mobile communication terminal 100.

The controller 190 controls the overall operation of the mobile communication terminal 100. The controller 190 may include a guide image generator 192 and a guide image selector 194 to create a panoramic photograph.

After a reference image is taken, the guide image generator 192 generates a guide image using the reference image. More specifically, the guide image generator 192 extracts a specific rectangular region formed along each side of the reference image and stores the extracted regions to generate four guide images.

The guide image selector 194 receives information from the movement sensor 180 regarding the distance and direction in which the camera module 110 has moved and selects a suitable guide image to be displayed with the current preview image according to the received information.

A method for taking a panoramic photograph according to an exemplary embodiment of the present invention performed by the mobile communication terminal 100 having the above-mentioned configuration is described in detail with reference to FIG. 1, FIG. 2A, FIG. 2B, FIG. 3, FIG. 4, FIG. 5A, FIG. 5B, FIG. 5C, FIG. 5D, FIG. 5E, FIG. 5F, and FIG. 5G. The above-described configuration of the mobile communication terminal 100 will also become more apparent from the following description of a panoramic photography method.

Figure 2A:
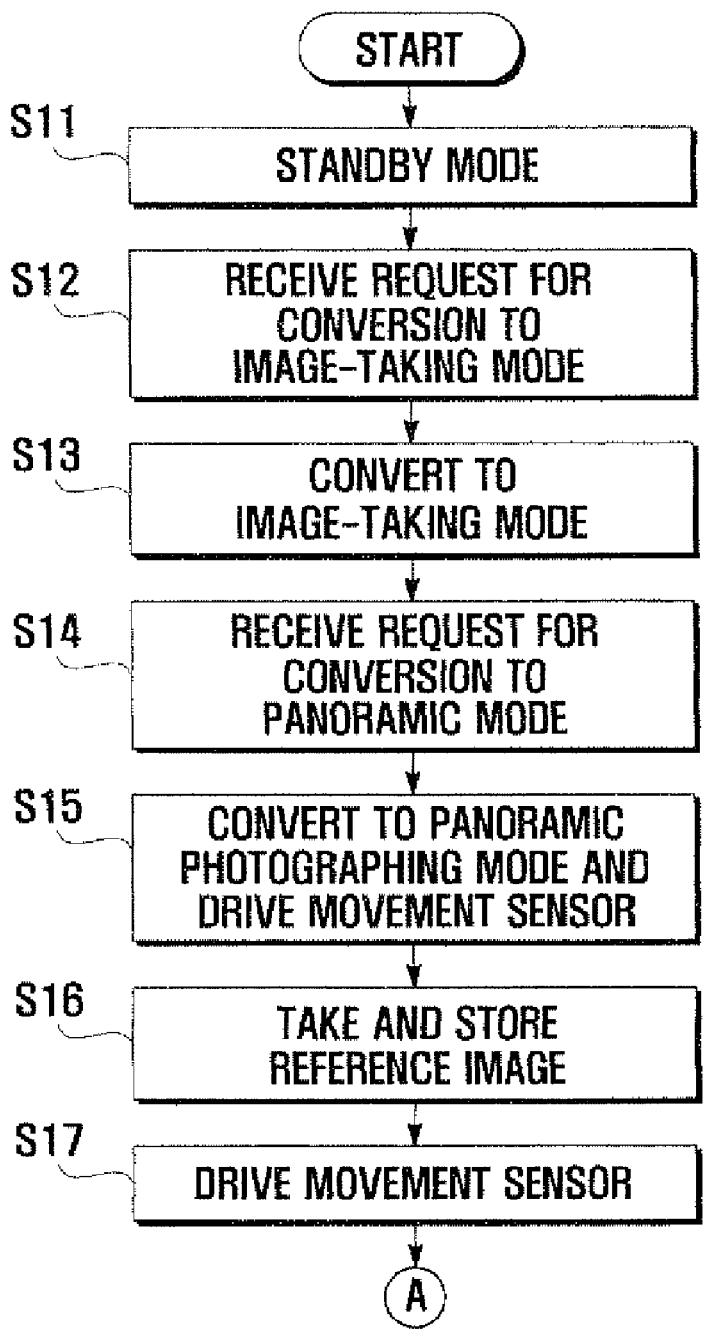
FIG. 2A and FIG. 2B are flowcharts showing a method for taking a panoramic photograph according to an exemplary embodiment of the present invention.
Figure 2B:
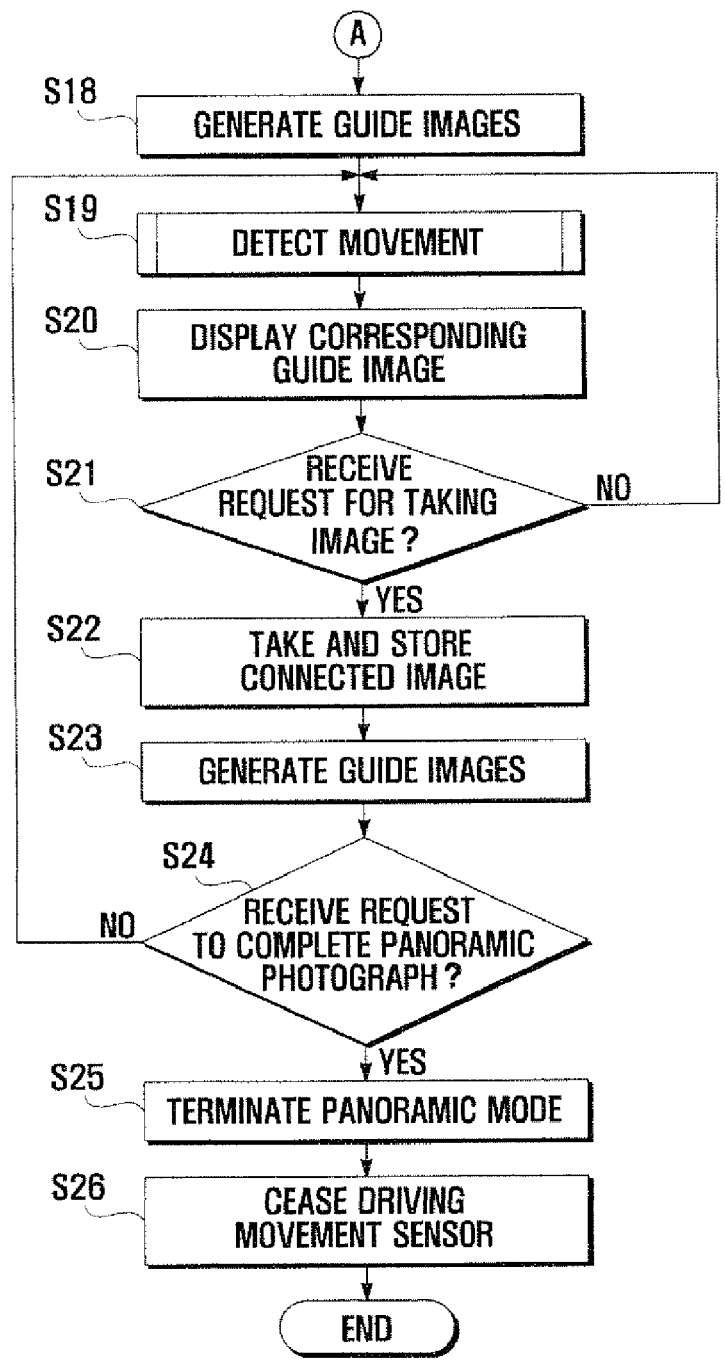
Figure 3:
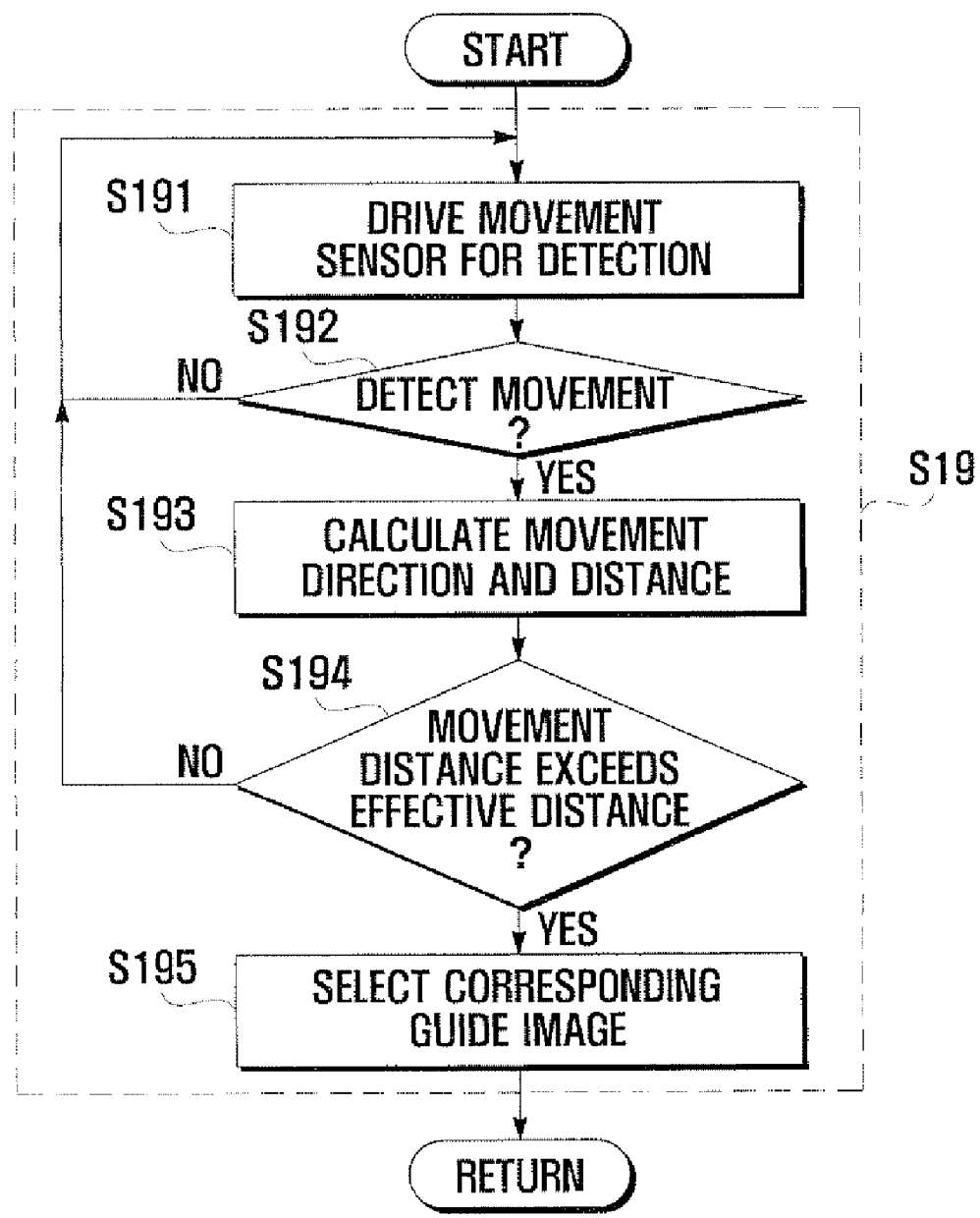
FIG. 3 is a flowchart showing a process of detecting movement of a mobile communication terminal according to the method of FIG. 2.
Figure 4:
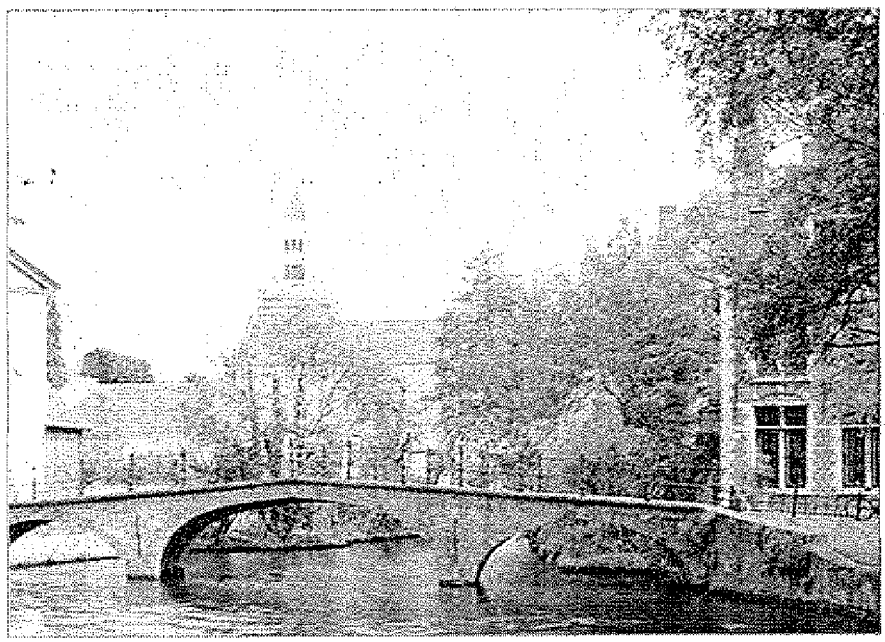
FIG. 4 shows an example of an entire photography background.

FIG. 2A and FIG. 2B are flowcharts showing a method for taking a panoramic photograph according to an exemplary embodiment of the present invention. FIG. 3 is a flowchart showing a process of detecting movement of the mobile communication terminal 100 according to the method of FIG. 2. FIG. 4 shows an example of an entire photography background. FIG. 5A, FIG. 5B, FIG. 5C, FIG. 5D, FIG. 5E, FIG. 5F, and FIG. 5G schematically show examples of display screens of the mobile communication terminal 100 according to the method of FIG. 2.

In the present exemplary embodiment of the panoramic photography method, a user takes a panoramic photograph of the background shown in FIG. 4.

Referring to FIG. 1, FIG. 2A, and FIG. 2B, the mobile communication terminal 100, which is initially in a standby mode (S11), receives a request for conversion to an image-taking mode (S12) that may be input through a user's key manipulation. The controller 190 of the mobile communication terminal 100 converts the mobile communication terminal 100 from the operating mode to the image-taking mode (S13).

The controller 190 drives the camera module 110 to convert an image signal input from the outside to image data and to output the image data to the image processor 120. The image processor 120 converts the received image data to digital data suitable for display on the display unit 150 and outputs the digital data to the display unit 150. Thus, a preview image input from the camera module 110 may be displayed in real time on the display unit 150.

If the user inputs the panoramic mode conversion key 162 (S14) while viewing the preview image in the image-taking mode of the mobile communication terminal 100, the controller 190 converts the mobile communication terminal 100 to a panoramic photographing mode (S15). Although not shown, upon conversion to the panoramic photographing mode, the controller 190 may check whether there is sufficient free space in the storage unit 170 to store images taken in sequence (reference image and connected images) and the corresponding guide images generated. If there is insufficient free space in the storage unit 170, the controller 190 may control the display unit 150 to display a pop-up message notifying the user that there is insufficient storage space to store the images.

The user may move the mobile communication terminal 100 toward an object of interest, such as a person or background. Although FIG. 5A, FIG. 5B, FIG. 5C, FIG. 5D, FIG. 5E, FIG. 5F, and FIG. 5G show an example in which an image of an upper left corner of the background shown in FIG. 4 is taken first, another portion thereof may be taken first. When a desired background is displayed as a preview image on a screen of the display unit 150, the user may input the image-taking key 164. The controller 190 then extracts the image that is currently being displayed using the camera module 110 and controls the storage unit 170 to store the extracted image (hereinafter referred to as a 'reference image') R (S16). The controller 190 also drives the movement sensor 180 (S17).

Figure 5A:
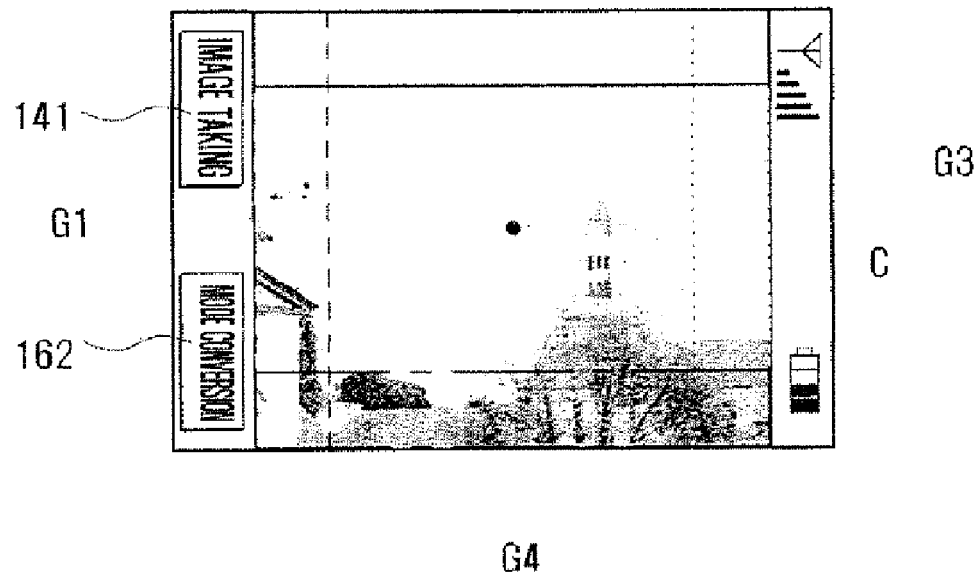
FIG. 5A, FIG. 5B, FIG. 5C, FIG. 5D, FIG. 5E, FIG. 5F, and FIG. 5G schematically show examples of display screens of a mobile communication terminal according to the method of FIG. 2.

Referring to FIG. 2B, after storing the reference image R in the storage unit 170, the guide image generator 192 generates guide images G1, G2, G3, and G4 (hereinafter collectively referred to as 'G') using the reference image R, and stores the guide images G in the storage unit 170 (S18). The four guide images G are generated by extracting specific regions near sides of the reference image R. According to the present exemplary embodiment, the four guide images G are generated along the top, bottom, left, and right sides of the reference image R, as shown in FIG. 5A. While FIG. 5A indicates the regions corresponding to the reference image R and the guide images G by dotted or solid lines for a better understanding of the present invention, the reference image R and the guide images G are not actually indicated by any marks on the display unit 150 during generation of the guide images G.

Further, as shown in FIG. 5A, each guide image G is defined by a rectangular region that includes one of the four sides of the reference image R. However, the guide images G are not limited thereto and may have various shapes, including squares and ellipses.

Subsequently, the movement sensor 180 detects movement of the camera module 110 of the mobile communication terminal 100 (S19). Referring to FIG. 3, which shows step S19 in more detail, the movement sensor 180 is driven to detect movement of the mobile communication terminal 100 with an origin at a position where the reference image is taken, i.e. at the center (C of FIG. 5A) of the reference image R (S191). In the present exemplary embodiment, a gyro sensor is used as the movement sensor 180 to detect movement of the mobile communication terminal 100. However, the movement sensor 180 may be any other device, such as an acceleration sensor, which is capable of detecting movement of the mobile communication terminal 100.

After taking the reference image R, the user may move the mobile communication terminal 100 in a desired direction to take connected images that are to be stitched to the reference image. If the movement sensor 180 detects the movement of the mobile communication terminal 100 (S192), the movement sensor 180 calculates in real time the direction and distance that the mobile communication terminal 100 moved and outputs the movement direction and distance to the guide image selector 194 (S193).

The movement sensor 180 according to the present exemplary embodiment may measure only the distance moved by the mobile communication terminal 100 in directions that are up, down, left, and right with respect to the center C of the reference image R. More specifically, the movement sensor 180 may measure only a vertical component of movement (i.e. movement in the up and down directions with respect to the center C) and a horizontal component of movement (i.e. movement in the left and right directions with respect to the center C) and calculates the measured results. However, the movement sensor 180 may also calculate the movement distance in other ways.

The movement sensor 180 continuously detects movement of the mobile communication terminal 100 and outputs the measured movement distance and movement direction in real time to the guide image selector 194.

The guide image selector 194 then determines whether the movement distance of the mobile communication terminal 100 exceeds an effective distance (S194).

According to the present exemplary embodiment, an effective distance may be defined as the distance by which the mobile communication terminal 100 must move to cause the preview image to deviate by one half of the entire region of the reference image R shown in FIG. 5A. An effective distance in the vertical direction may be different from an effective distance in the horizontal direction. Thus, if the center C of the reference image R deviates outside the perimeter of the entire region of the reference image R as a result of movement of the mobile communication terminal 100, the guide image selector 194 determines that the movement distance exceeds the effective distance. The effective distance is set to exclude very slight movements of the mobile communication terminal 100, which may be caused by shaking of the user's hands, from calculation of the movement distance. Therefore, the effective distance is not limited to a specific value but may be set to various other distance metrics. For example, the effective distance may be set to the distance by which the mobile communication terminal 100 must be moved to cause a preview image to deviate by two thirds of the entire region of the reference image R.

If the movement distance of the mobile communication terminal 100 does not exceed the effective distance at step S194, the guide image selector 194 determines that the mobile communication terminal 100 has not moved to take a series of consecutive panoramic images and returns to step S191 to wait for further input of movement.

Figure 5B:

If the movement distance exceeds the effective distance, for example, if the user moves the mobile communications terminal 100 to the right to the position shown in FIG. 5B, the guide image selector 194 recognizes through the movement sensor 180 that the mobile communication terminal 100 has moved to the right with respect to the reference image R by a distance exceeding the effective distance and allows the user to take a connected image that may be stitched to the reference image. If the mobile communication terminal 100 moves by more than the effective distance as above, the guide image selector 194 selects the guide image G3 in FIG. 5A, which is located adjacent to a side of the reference image R toward which the mobile communication terminal 100 has moved, i.e. the guide image G3 located in the direction of the movement of the mobile communication terminal 100. If the mobile communication terminal 100 has moved to the right of the reference image R, as shown in FIG. 5B, the guide image selector 194 selects the guide image G3 adjacent to the right side of the reference image.

Figure 5C:
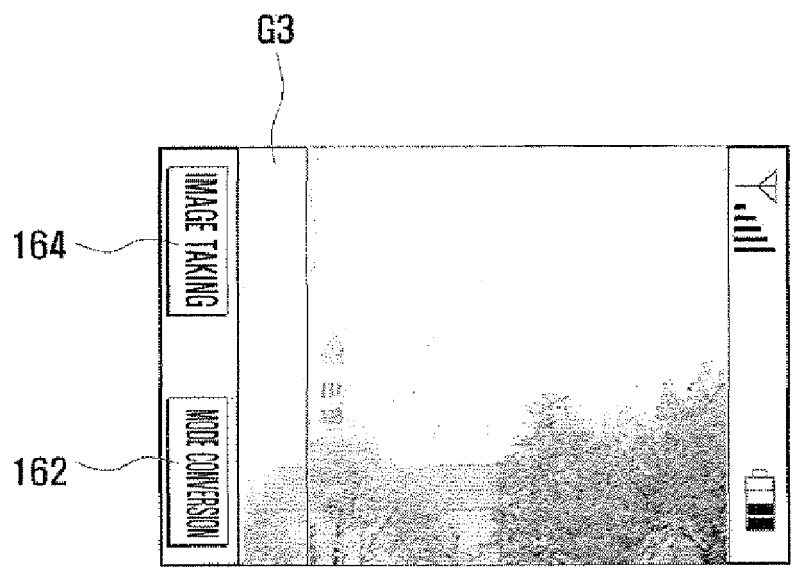

Returning to FIG. 2B, after detecting movement of the mobile communication terminal 100 through the above steps shown in FIG. 3, the controller 190 controls the display unit 150 to display the selected guide image G3 on the screen, as shown in FIG. 5C (S20). According to the present exemplary embodiment, the display unit 150 displays the selected guide image G3 such that the guide image G3 overlaps the preview image.

Alternatively, the display unit 150 may display an edge extracted from the selected guide image G3 or may display the guide image G3 in a blinking manner. In this case, "edge" is a term well known in the field of image analysis, which refers to a portion of an image at which a pixel brightness changes from high to low or vice versa. Typically, an edge of an image contains information about the image, including the position, shape, size, and pattern of the image.

Figure 5D:
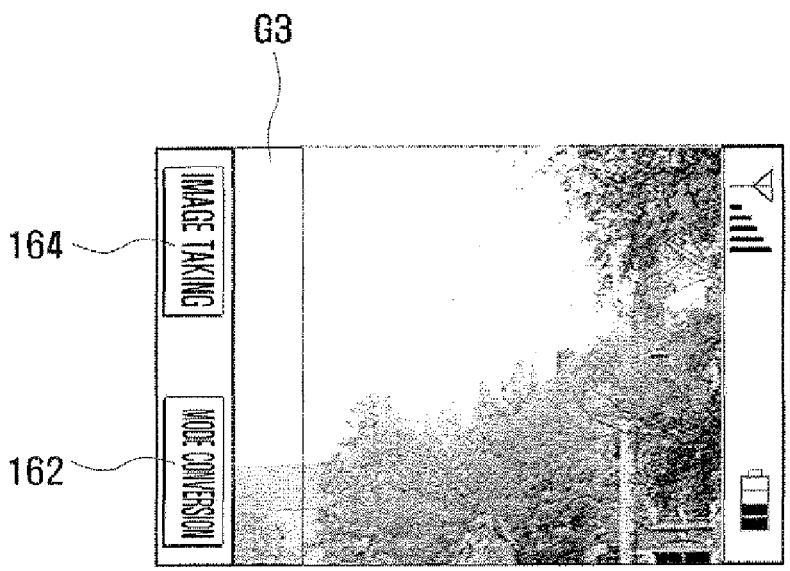

When the preview image and the guide image G3 are displayed together on the screen of the display unit 150, the user may gradually move the mobile communication terminal 100 so that the guide image G3 matches the preview image as shown in FIG. 5D. In this case, although not shown, the controller 190 may recognize when the guide image G3 matches the preview image and may output an alarm signal to the user. To output the alarm signal to the user, the controller 190 may control the audio processor 140 to output an audio signal, or the controller 190 may control the display unit 150 to blink or display a specific icon.

Meanwhile, even though the guide image G3 may be continuously displayed on the display unit 150 after performing step S20, the movement sensor 180 continues to measure the distance and direction in which the mobile communication terminal 100 moves. The guide image selector 194 also continues to check whether the movement distance exceeds the effective distance.

If the user moves the mobile communication terminal 100 in a different direction while the guide image G3 is displayed on the preview screen, for example if the user moves the mobile communication terminal 100 located at the position shown in FIG. 5C or FIG. 5D downward with respect to the reference image of FIG. 5A, the controller 190 repeatedly performs step S19 of sensing the movement of the mobile communication terminal 100 and step S20 of displaying a corresponding guide image G. That is, the selected guide image G for the downward movement is guide image G4 in FIG. 5A.

Figure 5E:
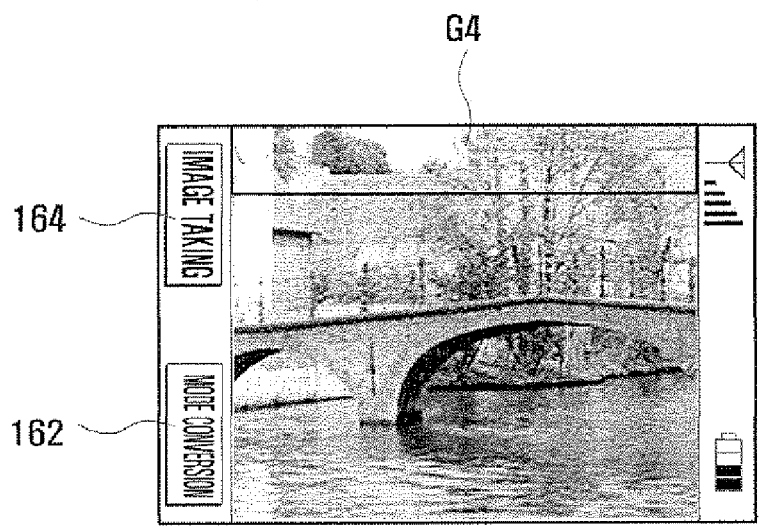
Figure 5F:
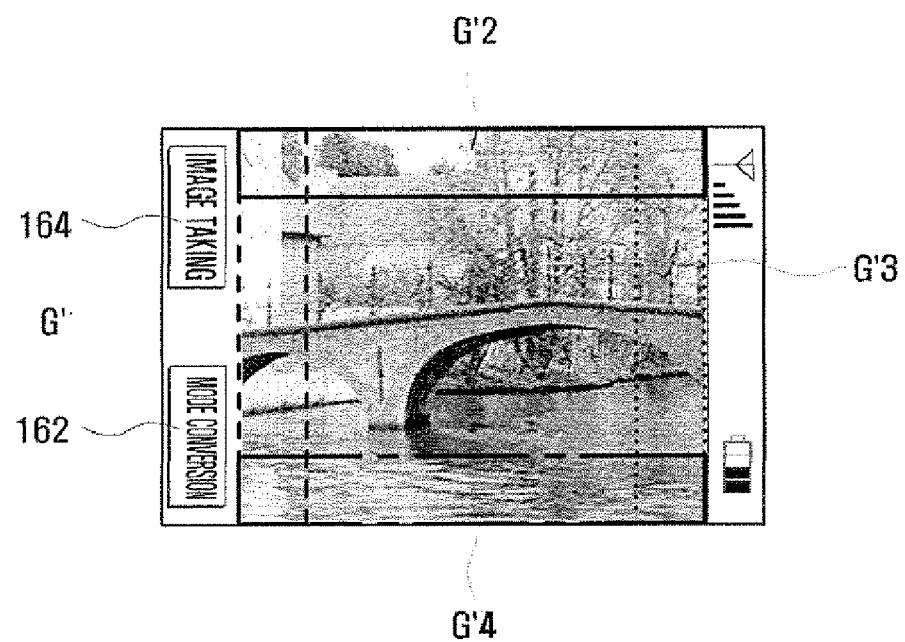
Figure 5G:
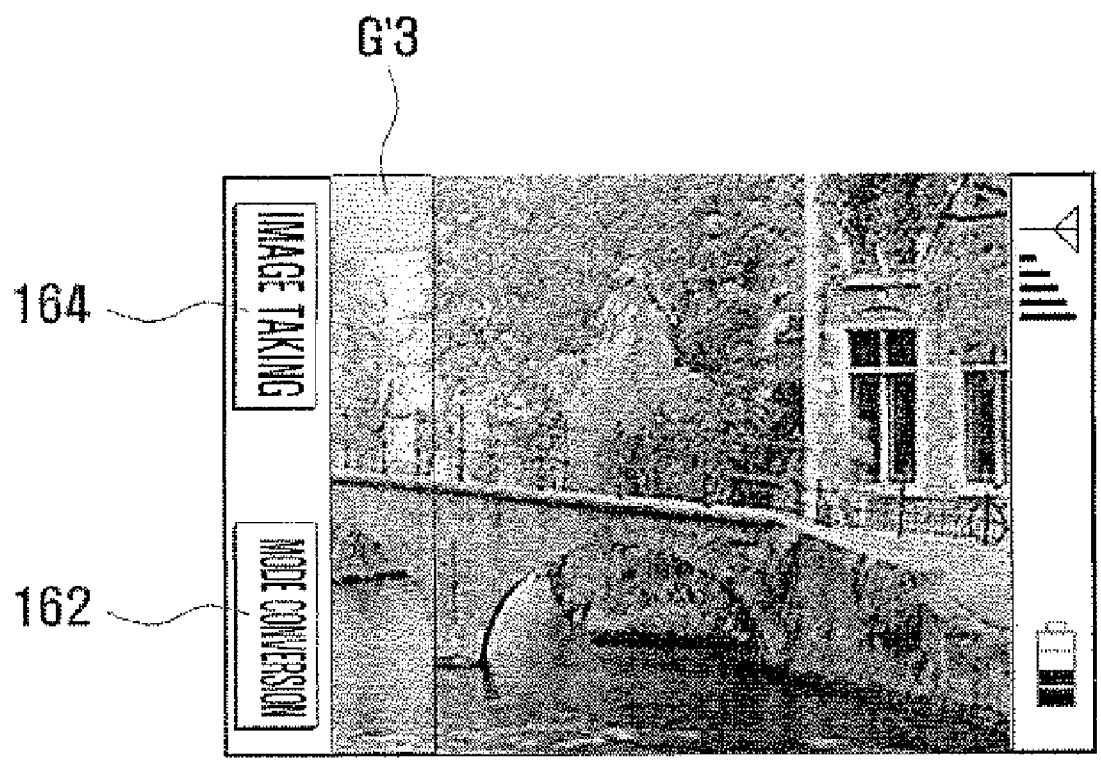

If the user inputs the image-taking key 164 when the guide image G4 matches the preview image as shown in FIG. 5E (S21), the controller 190 receives a request to take an image and extracts a current preview image and stores the preview image in the storage unit 170 as a connected image (S22). The guide image generator 192 then generates guide images G'1 through G'4 (hereinafter collectively referred to as 'G'') using the stored connected image (S23), as shown in FIG. 5F. Generating guide images G' is performed in the same manner as the above step S18 of generating the guide images G using the reference image.

Further, a plurality of connected images may be consecutively taken by the user. More specifically, if a connected image is taken and stored at step S22 and guide images G' are generated at step S23, the stored connected image serves as the reference image as described above. Thus, if desired, the user may repeatedly performs steps S19 through S21 using the guide images G' and then take another connected image to be stitched to the previously stored connected image.

A process of taking a panoramic photograph of the entire background in FIG. 4 is briefly described with reference to FIG. 5A, FIG. 5B, FIG. 5C, FIG. 5D, FIG. 5E, FIG. 5F, and FIG. 5G as follows. If the user sequentially takes panoramic images (i.e. the top left, top right, bottom left, and bottom right of the entire background), the top left portion of the background, shown in FIG. 5A, may be taken first as a reference image. Subsequently, the top right portion of the background, shown in FIG. 5D, may be taken as a connected image using the guide image G3 generated from the reference image.

The mobile communication terminal 100 may then be moved to the bottom left to take the bottom left portion, shown in FIG. 5E, as a connected image. In this case, a guide image G4 generated from the reference image is displayed on the screen. Lastly, the mobile communication terminal 100 may be moved to the bottom right to take the bottom right portion, shown in FIG. 5G, as a connected image. In this case, a guide image G'3 generated from the connected image shown in FIG. 5F is displayed on the screen.

A panoramic photography method according to exemplary embodiments of the present invention allows generation of guide images for each connected image taken. Hence, it is possible to take the connected image shown in FIG. 5G using guide images (not shown) generated from the connected image in FIG. 5D instead of guide images generated from the connected image shown in FIG. 5F.

This panoramic photography method allows the user to change the photographing order as desired. That is, the user may not need to sequentially take images, i.e. for example in a preset sequence of top left, top right, bottom left, and then bottom right. Thus, the user may take images using guide images in any order, thereby enabling a smooth connection between adjacent images.

If the user inputs a request to complete taking a panoramic photograph by inputting the panoramic mode conversion key 162 after taking and storing at least one connected image, the controller 190 stitches together the reference image and the connected image(s) according to the photographing order and detected direction to create a single panoramic photograph and stores the panoramic photograph (S24). The controller 190 may also delete all guide images generated from the reference image and connected images from the storage unit 170. The controller 190 then terminates the panoramic photographing mode (S25).

The controller 190 ceases driving the movement sensor 180 and converts the mode of the mobile communication terminal 100 to a general image-taking mode or standby mode, thereby terminating the process of taking a panoramic photograph (S26).

A method for taking a panoramic photograph according to exemplary embodiments of the present invention may enable detection of the mobile communication terminal 100 through the analysis of an image that is input to the camera module 110 without using the movement sensor 180. A method for taking a panoramic photograph according to another exemplary embodiment of the present invention is briefly described as follows.

The method according to the present exemplary embodiment is performed in substantially the same manner as the previous exemplary embodiment except for the step of detecting movement of the mobile communication terminal 100. Thus, the present exemplary embodiment is described mainly with respect to the step of detecting movement of the mobile communication terminal 100.

Figure 6:
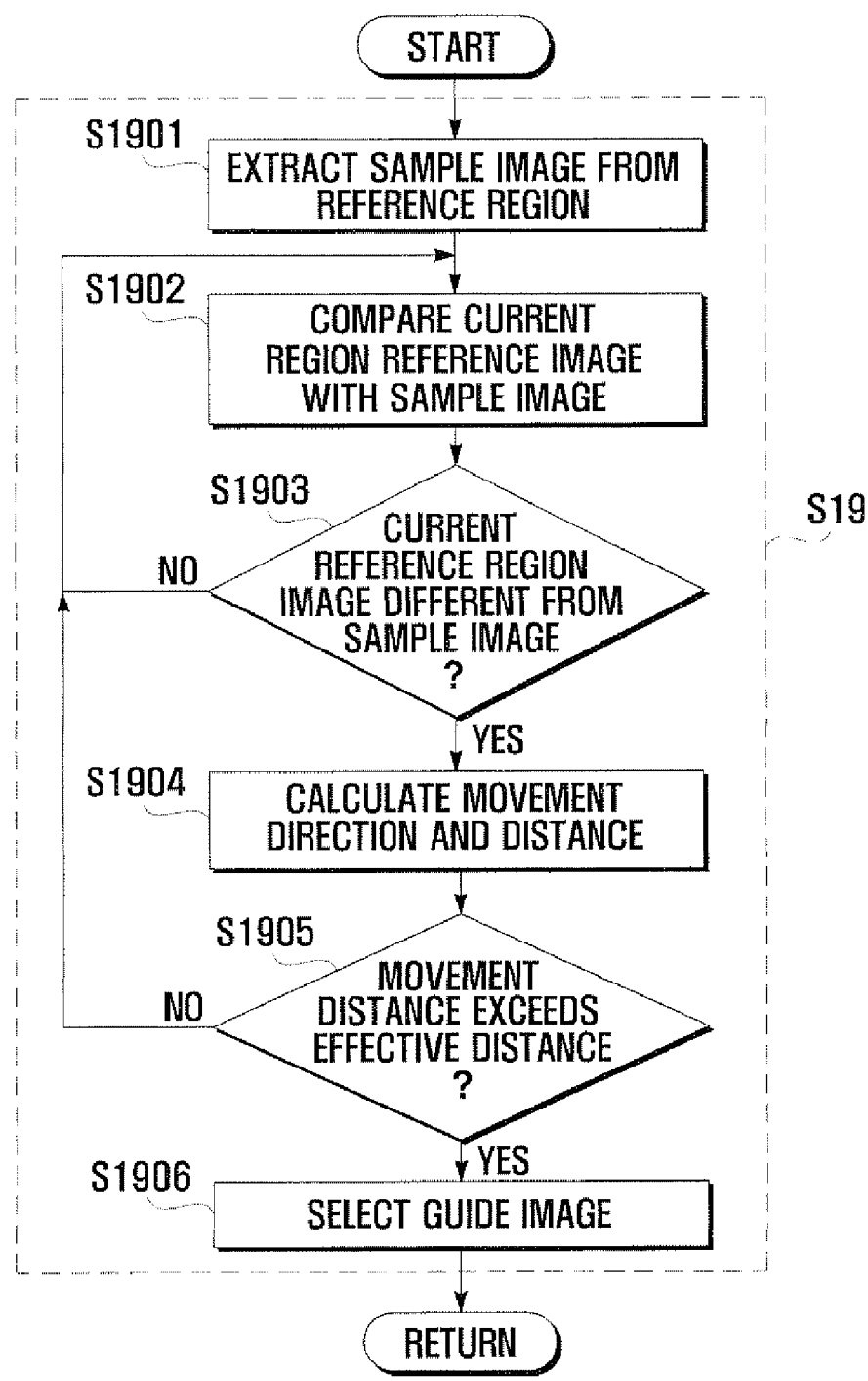
FIG. 6 is a flowchart showing another process of detecting movement of a mobile communication terminal according to the method of FIG. 2.
Figure 7:
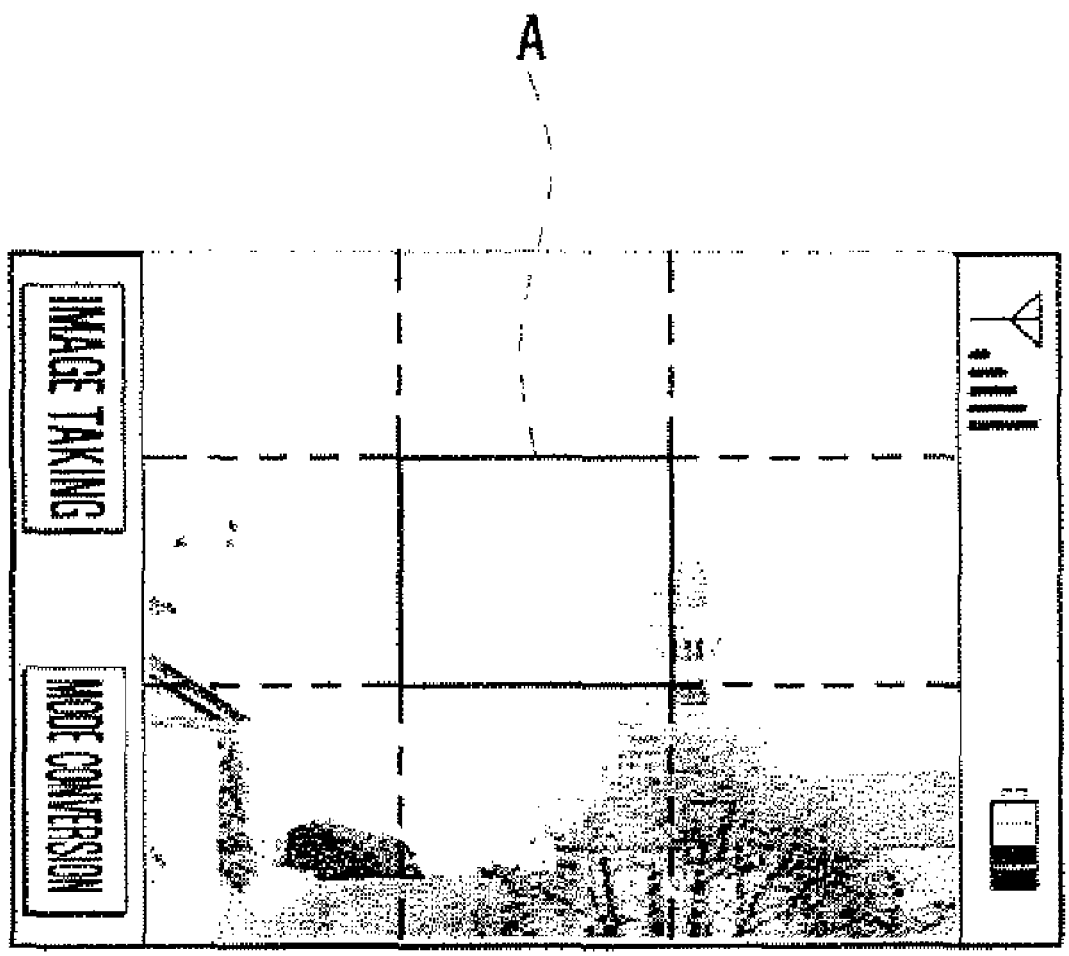
FIG. 7 schematically shows an example of a display screen of a mobile communication terminal according to the process of FIG. 6.

FIG. 6 is a flowchart showing another process of detecting movement of the mobile communication terminal 100 according to the method of FIG. 2. FIG. 7 schematically shows an example of a display screen of the mobile communication terminal 100 according to the process of FIG. 6.

The step S19 of detecting the movement of the mobile communication terminal 100 according to the present exemplary embodiment is described in detail with reference to FIG. 1, FIG. 2, FIG. 4, FIG. 6, and FIG. 7. First, the controller 190 extracts an image from a reference region A (the extracted image is hereinafter referred to as a 'sample image') of a reference image (or of a previously stored connected image) (S1901). FIG. 7 shows a screen divided into nine regions wherein a region at the center is used as a reference region A. However a reference region A of various other sizes may be formed at other positions, with the only limitation being that the controller 190 be able to easily determine and extract a change in an image therefrom.

Thereafter, the controller 190 compares the extracted sample image with an image being displayed in the reference region A on a current preview screen (S1902). More specifically, the controller 190 detects whether there is a change in the image displayed in the reference region A as compared to the extracted sample image, and, if the current reference region image is different from the sample image, the controller 190 determines that the mobile communication terminal 100 has moved (S1903).

If the current reference region image is different from the sample image at step S1903, that is, if the user moves the mobile communication terminal 100 to take consecutively connected images, the controller 190 recognizes the movement and calculates the distance and direction by which the communication terminal 100 is moved using the image being displayed in the reference region A on the current preview screen with the sample image (S1904). To achieve this function, the controller 190 may extract data at a position corresponding to the reference region A from each frame in image data transmitted to the display unit 180 and may compare the data with the sample image.

If the mobile communication terminal 100 is moved very rapidly across a large range, an overlapping portion may not exist between the sample image and the image of the reference region A being displayed on the current preview screen. In this case, it may be difficult to calculate the movement distance and movement direction by comparing the two images with each other. Thus, it is preferable that the mobile communication terminal 100 be moved slowly to allow for easy comparison.

After calculating the movement distance and movement direction, the guide image selector 194 uses the movement distance and movement direction to determine whether the movement distance of the mobile communication terminal 100 exceeds an effective distance (S1905). The effective distance is applied in the same manner as in the previous exemplary embodiment, and therefore, a detailed description thereof is not included here.

If the movement distance of the mobile communication terminal 100 does not exceed an effective distance at step S1905, the guide image selector 194 returns to step S1902 in order to continuously compare the sample image with an image being displayed in the reference region A on a current preview screen. If the movement distance of the mobile terminal 100 does exceed an effective distance at step S1905, the guide image selector 194 selects a guide image located in the same direction as the calculated movement direction (S1906).

After performing step S19 in this manner, the guide image selector 194 displays the selected guide image at step S20, shown in FIG. 2B, and performs subsequent steps in the same manner as in the previous exemplary embodiment.

A panoramic photography method and apparatus according to exemplary embodiments of the present invention eliminate the need to set a photographing order before taking a panoramic photograph. Exemplary embodiments of the present invention also enable automatic display of a guide image suitably selected according to movement of a photographing mobile communication terminal, thus allowing the user to take the desired number of images in the desired directions regardless of a preset photographing order.

For example, a panoramic photography method according to exemplary embodiments of the present invention is not limited to a mobile communication terminal but may be applied to all other types of digital devices having a built-in camera module (e.g. digital camera). Further, although in the above description a panoramic photograph is created after terminating a panoramic photographing mode, a panoramic photograph may be created in various other ways. For instance, a previously taken reference image (or a previously taken connected image) may be stitched together with each connected image currently being stored to form a panoramic photograph in real time.

As described above, a panoramic photography method and apparatus according to exemplary embodiments of the present invention may eliminate the need to preset a photographing order according to the entire composition of a panoramic photograph while enabling automatic display of a guide image suitably selected according to movement of a mobile communication terminal. Thus, exemplary embodiments of the present invention may allow for easy taking of panoramic photographs with simple manipulation, thereby providing excellent convenience to users. The present invention may also enable a user to create a panoramic photograph by taking images as desired without conforming to a preset photographing order.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for taking a panoramic photograph, comprising:
    taking a reference image that is a portion of the panoramic photograph;
    generating a plurality of guide images using portions of the reference image; and
    detecting movement of an image-taking device and displaying a guide image selected from the generated plurality of guide images according to the detected movement of the image-taking device.

2. The method of claim 1, further comprising using the selected guide image to take a connected image.

3. The method of claim 2, wherein generating a plurality of guide images comprises generating four guide images by extracting a top side portion, a bottom side portion, a left side portion, and a right side portion of the reference image.

4. The method of claim 3, wherein each of the four guide images has a rectangular shape that includes one side portion of the four side portions of the reference image.

5. The method of claim 2, wherein detecting movement of an image-taking device and displaying a guide image comprises:
    calculating a movement distance and a movement direction of the image-taking device; and
    selecting a guide image corresponding to the movement direction if the movement distance exceeds an effective distance.

6. The method of claim 5, wherein the movement distance refers to the distance moved by the image-taking device in the vertical and horizontal directions with respect to a position at which the reference image is taken.

7. The method of claim 5, wherein the movement direction is one of an up direction, a down direction, a left direction, and a right direction with respect to a position at which the reference image is taken.

8. The method of claim 5, wherein the effective distance refers to a distance by which the image-taking device must be moved to cause a displayed image to deviate by one half of the entire region of the reference image in the vertical and horizontal directions.

9. The method of claim 5, wherein the selected guide image is located in the same direction as the movement direction.

10. The method of claim 9, wherein the selected guide image is displayed by overlapping a preview image.

11. The method of claim 5, wherein a gyro sensor is used to detect the movement of the image-taking device.

12. The method of claim 5, wherein detecting movement of the image-taking device comprises:
    extracting a specific region of the reference image as a sample image; and
    comparing the sample image with an image input through a camera module to detect the movement of the image-taking device.

13. The method of claim 2, further comprising:
    generating a new guide image using the connected image as a new reference image; and
    taking another connected image using the new guide image.

14. The method of claim 1, wherein the detecting movement of the image-taking device is performed upon generation of the plurality of guide images.

15. An apparatus for taking a panoramic photograph, comprising:
    a camera module to take a reference image that is a portion of the panoramic photograph and a connected image that is connected to a side of the reference image;
    a guide image generator to generate a plurality of guide images using portions of the reference image;
    a movement sensor to detect movement of the camera module;
    a guide image selector to select a guide image from the generated plurality of guide images according to movement of the camera module; and
    a display unit to display the selected guide image together with a preview image.

16. The apparatus of claim 15, wherein the movement sensor comprises a gyro sensor.

17. The apparatus of claim 15, wherein the movement sensor is adapted to extract a specific region of the reference image as a sample image, compare the sample image with an image input through the camera module, and detect the movement of the camera module according to the comparison.

18. The apparatus of claim 15, further comprising a storage unit to store guide images generated by the guide image generator.

* * * * *